United States Patent Office 3,364,239
Patented Jan. 16, 1968

3,364,239
METHOD FOR PREPARING SECONDARY AMINO POLYALKOXY MONOALKANOLS
George P. Speranza, Austin, Tex., assignor to Jefferson Chemical Company, Inc., Houston, Tex., a corporation of Delaware
No Drawing. Filed Dec. 5, 1963, Ser. No. 328,202
5 Claims. (Cl. 260—347.7)

ABSTRACT OF THE DISCLOSURE

Secondary amino polyalkoxy monoalkanols represented by the formula:

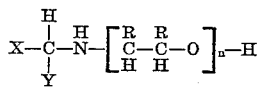

where R is hydrogen, methyl, ethyl and phenyl; X is a 1 to 17 carbon atom alkyl, cycloalkyl, aryl, aralkyl or furfuryl group; Y is hydrogen or X; and $n$ is an integer having a value of 2 to about 50 can be produced by reacting an aldehyde or ketone represented by the formula XYC=O with a primary amino alkoxy monoalkanol to form a Schiff base which is catalytically hydrogenated to form the secondary amine reaction product. Higher molecular weight products can be made by alkoxylating prior to hydrogenation.

---

This invenntion relates to a method for preparing secondary monoamino polyalkoxy monoalkanols. More particularly, this invention relates to a method for the production of secondary amino polyalkoxy alkanols that may be represented structurally by the formula:

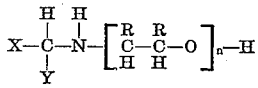

wherein R is selected from the class consisting of hydrogen, methyl, ethyl and phenyl; wherein X is a 1 to 17 carbon atom group selected from the class consisting of alkyl, cycloalkyl, aryl, aralkyl and furfuryl; wherein Y is selected from the class consisting of hydrogen and X; and wherein $n$ is a positive integer having a value of 2 to about 50.

In accordance with the present invention, compounds of the above-defined class are prepared by reacting a primary amino polyalkoxy alkanol, as hereinafter defined, with an aldehyde or ketone, as hereinafter defined, to provide an intermediate product (which may be a Schiff base) which is concomitantly or sequentially hydrogenated under hereinafter defined hydrogenation conditions in the presence of a hydrogenation catalyst.

An almost quantitative yield of secondary amino polyalkoxy monoalkanols is obtained by first reacting the aldehyde or ketone with a primary amino alkoxy monoalkanol to form a Schiff base which is then hydrogenated (after an intermediate alkoxylation step, if desired) to provide the desired secondary amino polyalkoxy monoalkanol product. It has also been discovered in accordance with the present invention that good yields of the desired products can be obtained in an expedient, convenient manner by bringing a mixture of a primary amino polyalkoxy monoalkanol with a carbonyl compound into contact with a hydrogenation catalyst under hereinafter defined hydrogenation conditions, whereby the principal reaction product that will be formed is the desired secondary amino polyalkoxy monoalkanol and whereby hydrogenation of the carbonyl compound is of little significance.

When it is desired to conduct the process of the present invention by sequential Schiff base formation and hydrogenation, the starting material will be a primary amino alkoxy alkanol which is reacted with an aldehyde or ketone to form a Schiff base and which, if desired, may be reacted with an alkylene oxide prior to the hydrogenation step. This is shown, for example, in co-pending Speranza et al. application Ser. No. 860,317, filed Dec. 18, 1959, now U.S. Patent No. 3,110,732, and entitled "Method for Preparing Basic Polyether Compositions." Briefly, as disclosed in the said application, a carbonyl compound corresponding to the general formula XYC=O is reacted with about an equimolar amount of a primary amino alkanol of the general formula

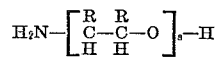

to form a Schiff base.

In the above formulae, X, Y and R have the meaning given above and $s$ is a positive integer having a value of about 1 to about 50.

The Schiff base reaction will normally occur at a temperature within the range of about 50° to about 175° C. and, if desired, is conducted in an organic solvent solution to permit the removal of by-product water formed during the reaction.

At least in a situation where $s$ has a value of 1 and also, if desired, when $s$ has a value greater than 1, an alkylene oxide may be added to the Schiff base to increase the molecular weight; this being desirable for many purposes. When this is to be done, the Schiff base-containing reaction product is rendered substantially completely anhydrous and an anyhdrous oxyalkylation catalyst such as sodium or potassium, sodium or potassium hydride, sodium or potassium amide, sodium or potassium hydroxide, etc., is added, followed by the addition of a desired amount of an epoxide corresponding to the following general formula:

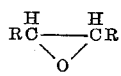

wherein R has the meaning given above.

The alkoxylation reaction is suitably conducted at a temperature within the range of from about 40° to about 200° C. and, more preferably, from about 55° to about 100° C. at an appropriate pressure such as a pressure of about 0 to about 100 p.s.i.g.

As examples of suitable carbonyl compounds that may be utilized in accordance with the present invention (e.g., as starting materials for the Schiff base reaction), there may be mentioned compounds such as methyl ethyl ketone, methyl isobutyl ketone, ethyl isobutyl ketone, diethyl ketone, acetone (but not as a starting material for a Schiff base), acetophenone, benzophenone, butyl phenyl ketone, cyclohexone, phenyl benzyl ketone, dibenzyl ketone, dibutyl ketone, dihexyl ketone, diundecyl ketone, ethyl amyl ketone, methyl heptadecyl ketone, methyl undecyl ketone, benzaldehyde, butyraldehyde, caprylicaldehyde, 2-ethylbutyraldehyde, butylhexaldehyde, heptanoicaldehyde, furfuraldehyde, etc., and mixtures thereof.

As examples of suitable primary amino alkoxy monoalkanols that may be employed, there may be mentioned monoethanolamine, 2-(2-hydroxyethoxy)ethylamine, monoisopropanolamine, isobutanolamine, 2-aminopropanol, etc.

As examples of suitable epoxides that may be utilized, there may be mentioned ethylene oxide, propylene oxide, isobutylene oxide, 1,2-epoxybutane, 2,3-epoxybutane and styrene epoxide.

It is within the scope of the present invention to use two or more epoxides as defined herein. A particularly desirable mixture of epoxides is a mixture of ethylene oxide and propylene epoxide, which may be sequentially or concomitantly reacted with a Schiff base.

Thus, the Schiff base may be reacted with ethylene oxide and then with propylene oxide, or vice versa, to form block copolymers (Formulae I and II) or the ethylene oxide and propylene oxide may be premixed and then reacted with the Schiff base to give a heteric copolymer (Formula III). At completion of the alkoxylation and prior to hydrogenation, such products may be represented by the following formulae:

(I) 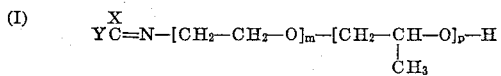

(II) 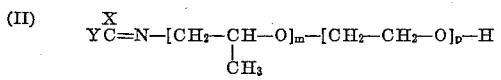

(III) 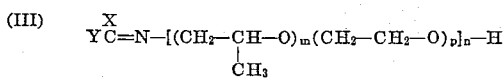

wherein $m$ has a value of 1 to 49 and, correspondingly, $p$ has a value of 49 to 1; X, Y and $n$ having the values given above.

Hydrogenation of the Schiff base is conducted under controlled reaction conditions in the presence of a hydrogenation catalyst, as hereinafter defined.

The reaction conditions that are preferably employed for hydrogenation of the Schiff base include a temperature within the range of about 50° to about 300° C., a pressure within the range of from about 30 to about 400 atmospheres and, more preferably, a temperature within the range of 100° to 200° C. and a pressure within the range of 65 to 225 atmospheres.

The presence of hydrogen is critical to the efficient production of the products of the present invention, and it is necessary that the hydrogen partial pressure amount to a substantial part of the total pressure of the reaction atmosphere. Thus, hydrogen should constitute at least 10, and preferably between 20 and 200, atmospheres of the total pressure of the system.

Any of the metallic hydrogenation catalysts known to those skilled in the art, such as nickel, copper, chromium, cobalt, platinum, etc., may be employed alone or in admixture. A preferred catalyst of the present invention which provides the best results is a catalyst containing a major amount of (a) nickel or cobalt, or a mixture thereof, (b) copper and (c) a minor amount of at least one normally non-reducible metal oxide selected from the group consisting of chromium oxide, molybdenum oxide, manganese oxide and thorium oxide. Suitably, the catalytically-active component of the catalyst (excluding the support, if any) will contain from about 90 to about 100 wt. percent of nickel, copper, cobalt, or mixtures thereof, and correspondingly, from about 0 to about 10 wt. percent of the normally non-reducible metal oxide. A preferred catalyst is characterized by having the composition calculated on an oxide-free basis of 60 to 85 wt. percent nickel, 14 to 37 wt. percent copper and 1 to 5 wt. percent chromium, with the catalyst in use consisting of nickel, copper and chromium oxide.

When the oxides of copper, nickel, cobalt, or mixtures thereof, are used as such, as a catalyst, the oxides are exposed to a reducing reaction medium and reduction of the oxides will occur until the oxides are largely, if not entirely, reduced to metallic form. Optionally, therefore, the oxide catalyst may be prereduced with hydrogen at a temperature within the range of about 200° to about 400° C. before use.

Although substantially quantitative yields of secondary amino alkanols are obtained by hydrogenating a preformed Schiff base, I have found that high yields of the secondary amino alkanols can be obtained by hydrogenating a mixture of a carbonyl compound with a primary amino alkanol containing 2 to 50 alkoxy groups. In this procedure the mixture of carbonyl (preferably in excess) and a primary amino alkoxy alkanol are heated at 50° to 250° C. under a hydrogen partial pressure of 20 to 300 atmospheres in the presence of the hydrogenation catalyst of the present invention. Thus, under these conditions hydrogenation of the amine-carbonyl addition product and/or Schiff base occurs substantially concomitantly with its formation and hydrogenation of the carbonyl compound is of minor significance.

The invention will be further illustrated with respect to the following specific examples, which are given by way of illustration and not as limitation on the scope of this invention.

*Example I.—Preparation of N-ethylhexylaminoethoxyethanol*

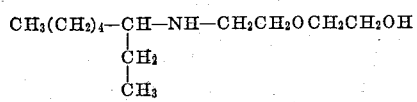

To a one-liter, stirred autoclave was added 430 grams (2 mols) of Schiff base prepared from ethyl amyl ketone and aminoethoxyethanol and 86 grams of hydrogenation catalyst containing 70% nickel, 25% copper and 5% chrome. The autoclave was assembled, the contents flushed twice with hydrogen and hydrogen added to 700 p.s.i.g. The reduction was carried out at 103° to 112° C. and 2500 p.s.i.g. for two hours. The product was filtered and distilled through 2.5 x 25 cm. of S.S. protruded packing. A center fraction was collected which weighed 322 grams (74% yield) and boiled at 123° to 124° C. at 2 mm. pressure. This material was pure N-ethylhexylaminoethoxyethanol. The infrared indicated no C=N present and near infrared showed NH at 1540 mμ and OH at 2080 mμ. The product has an equivalent weight of 217.6 by titration (theory, 217.4); $n_D^{20}$ of 1.4569; density at 20° C. of 0.9177. The molar refraction was 64.51 (theory, 64.38). One ml. of product was not miscible with 9 ml. of water but was miscible with 9 ml. of isooctane.

*Example II.—N-ethylpropylaminoethoxyethanol*

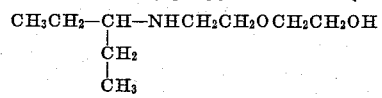

To a three-necked, one-liter flask equipped with a stirrer, thermometer, azeotroping head and a condenser was added 315 grams of 2-(2-hydroxyethoxy)ethylamine (aminoethoxyethanol), 258 grams of diethyl ketone and 100 grams of benzene. The reaction mixture was heated to boiling and 54 ml. of water removed over a period of seven hours. The benzene was removed by distillation until a pot temperature reached 170° C. The remainder was distilled at 10 mm. pressure and 395 grams of Schiff base collected boiling at 130° C. It was hydrogenated at 120° C. for one hour at 2500 p.s.i.g. over 50 grams of nickel-copper-chrome catalyst. The product was filtered and distilled. It boiled at 115° to 115.5° C. at 6 mm. (310 grams). The equivalent weight by titration was 175.3 theory 175.3). Analysis: $n_D^{20}$, 1.4547; density at 20° C., 0.9337; molar refraction, 50.91 (theory 50.53). It was soluble in isooctane and water.

*Example III.—N-Isopropylaminoethoxyethanol*

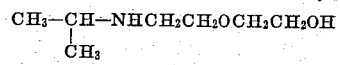

To a 1400 ml., rocking autoclave was added 86 grams of acetone, 158 grams of aminoethoxyethanol and 50 grams of nickel-copper-chrome catalyst. The contents were flushed twice with hydrogen and hydrogen added to 700 p.s.i.g. The mixture was hydrogenated at 120° C. and 3000 p.s.i.g. for two hours. The product was distilled at 5 mm. pressure and 152 grams collected boiling at 96° to 97° C. at this pressure. This fraction was 80% N-isopropylaminoethoxyethanol and 20% aminoethoxyethanol. Redistillation at 12 mm. gave a fraction boiling at 116° which was 95% pure N-isopropylaminoethoxyethanol. The product was soluble in water and isooctane. When the hydrogenation was carried out at 240° C. and 2500 p.s.i.g. for four hours, the main product was N-isopropylmorpholine (47% yield).

*Example IV.—N-2-ethylhexylaminoethoxyethanol*

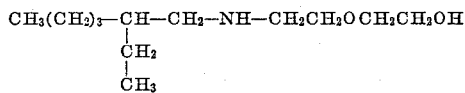

To a one-liter, three-necked flask equipped with a Dean-Stark trap, condenser, dropping funnel and thermometer was added 210 grams of aminoethoxyethanol. Then 2-ethylhexaldehyde (256 grams) was added over a 25-minute period. The temperature rose to 62° C. The mixture was heated to 110° C. and the water removed (34 ml.). The remainder was hydrogenated at 120° C. and 2500 p.s.i.g. in a 1400 ml., rocking autoclave with 50 grams of nickel-cooper-chrome catalyst. The filtered product (405 grams) was distilled at 1 mm. pressure through 2.5 x 25 cm. of S.S. packing. A fraction (224 grams) was collected which boiled at 124° C. at 1 mm. It had an equivalent weight of 218 (theory 217.4) and was insoluble in water but soluble in isooctane. The product was converted to N-2-ethylhexylmorpholine by heating with a nickel-copper-chrome catalyst at 220° and a hydrogen pressure of 1300 p.s.i.g. for four hours.

*Example V.—N-furfurylaminoethoxyethanol*

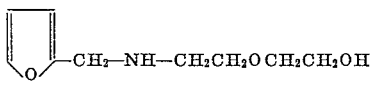

The Schiff base from furfural and aminoethoxyethanol was prepared in the usual manner. The product was hydrogenated at 120° C. over nickel-copper-chrome catalyst. One mol of hydrogen was absorbed. The product had an equivalent weight of 188 (theory 186), $n_D^{20}$ of 1.4961, density at 20° C. of 1.1097.

*Example VI.—N-ethylhexylaminopolyoxyethylethanol*

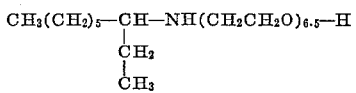

To a one-liter, three-necked flask equipped with a stirrer, condenser, Dean-Stark trap and thermometer was added 300 grams of polyethylene glycolamine–300 ($NH_2(CH_2CH_2O)_{6.5}H$), 100 grams of toluene and 150 grams of ethyl amyl ketone. The contents were heated to boiling and after seven hours 15 grams of water was collected. The toluene and excess ketone were removed to a pot temperature of 190° C. The residue was added to a 1400 ml., rocking autoclave with 75 grams of a nickel-copper-chrome hydrogenation catalyst. The contents were flushed with hydrogen and hydrogen added to 100 p.s.i.g. At 130° C., hydrogen was absorbed rapidly. Hydrogenation was further continued at 180° C. and 2000 p.s.i.g. for 1.5 hours. The product was filtered through Hyflo Supercel. The clear, yellow product weighed 383 grams. It was heated with 200 ml. of water to azetrope out low-boiling organics. The product was finally stripped to a temperature to 140° C. at 1.8 mm. It weighed 308 grams and was soluble in water, acetone, benzene, isopropanol, and insoluble in n-hexane. It had an equivalent weight of 430 and the infrared structure was consistent with the structure:

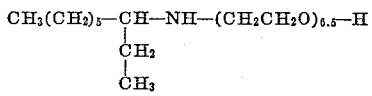

There was absorption at 1540 mμ in the near infrared which is indicative of the NH bond.

*Example VII.—N-2-ethylhexylpolypropyleneglycolamine*

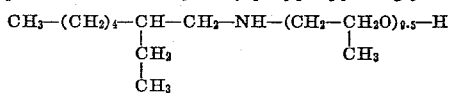

To a one-liter, three-necked flask equipped with a stirrer, thermometer, water azeotrope trap and condenser was added 500 grams of polypropylene glycolamine with an equivalent weight of 570, 150 grams of 2-ethylhexaldehyde and 100 grams of toluene. The reaction mixture was heated to boiling and after one hour, 14 ml. of water was collected; after three hours 16 ml. of water was removed, and then the toluene was removed by heating until a pot temperature of 190° C. was reached. The remainder was hydrogenated with 75 grams of nickel-copper-chrome catalyst in a 1400 ml., rocking autoclave. Hydrogenation was complete after two hours at 180° C. and 1200 p.s.i.g. The product was heated with water as described in Example VI to azeotrope out low-boiling organics. The treated product had an equivalent weight of 688 and was insoluble in water but soluble in n-hexane, isopropanol and benzene.

What is claimed is:

1. A method for preparing a secondary monoamino polyalkoxy monoalkanol which comprises contacting the reaction product of a carbonyl compound of the formula XYC=O with a primary amino polyalkoxy alkanol of the formula:

$$H_2N-[CHR-CHR-O]_n-H$$

with a hydrogenation catalyst under hydrogenation conditions including a temperature within the range of about 50° to about 300° C. and a pressure within the range of about 30 to about 400 atmospheres, including from about 20 to about 200 atmospheres partial pressure of hydrogen, to provide thereby a secondary amino polyalkoxy alkanol of the formula:

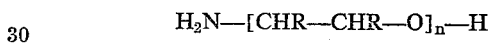

in said formulae X being a 1 to 17 carbon atom group selected from the class consisting of alkyl, and furfuryl, Y being selected from the class consisting of hydrogen and X, n being a positive integer having a value from about 2 to about 50 and R being a member selected from the class consisting of hydrogen, methyl, ethyl and phenyl.

2. A method as in claim 1 wherein the reaction conditions include a temperature within the range of about 100° to about 300° C. and a pressure within the range of about 65 to about 225 atmospheres including between about 20 and 200 atmospheres partial pressure of hydrogen and wherein the catalytically active component of said hydrogenation catalyst is a mixture of metal oxides having the composition, calculated on an oxide-free basis, of 60 to 85 wt. percent of nickel, 14 to 35 wt. percent of copper and 1 to 5 wt. percent of chromium.

3. A method for preparing secondary aminoethoxyethanol which comprises mixing a carbonyl compound of the formula XYC=O with aminoethoxyethanol and a hydrogenation catalyst, and heating said mixture to a temperature within the range of about 50° to about 250° C. at a pressure within the range of about 30 to about 400 atmospheres, including 20 to 300 atmospheres partial pressure of hydrogen, to preferentially hydrogenate the reaction product of said carbonyl compound with said aminoethoxyethanol and to provide a secondary aminoethoxyethanol corresponding to said carbonyl compound and said aminoethoxyethanol, X in said formula being a 1 to 17 carbon atom group selected from the group consisting of alkyl, and furfuryl and Y being selected from the class consisting of hydrogen and X.

4. A method which comprises the steps of reacting a carbonyl compound of the formula XYC=O with a primary amino alkanol of the formula:

$$H_2N-[CHR-CHR-O]_s-H$$

at a temperature within the range of about 50° to about 175° C. to form the corresponding Schiff base, reacting said Schiff base under substantially completely anhydrous conditions in the presence of an anhydrous oxyalkylation catalyst with an epoxide of the formula:

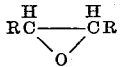

at a temperature within the range of about 40° to about 200° C. and a pressure within the range of about 0 to about 100 p.s.i.g. to provide an alkoxylation product having the formula:

and hydrogenating said alkoxylation product in the presence of a hydrogenation catalyst under reaction conditions including a temperature within the range of from about 50° to about 300° C. and a pressure within the range of about 30 to about 400 atmospheres, including a hydrogen partial pressure within the range of 60 to 225 atmospheres, to form a secondary amino polyalkoxy monoalkanol corresponding to said Schiff base, X being a 1 to 17 carbon atom group selected from the class consisting of alkyl and furfuryl, Y being selected from the class consisting of hydrogen and X, $n$ being a positive integer having a value from about 2 to about 50, $s$ being an integer having a value of from about 1 to about 50 and R being a member selected from the class consisting of hydrogen, methyl, ethyl and phenyl.

5. A method as in claim 4 wherein the reaction conditions include a temperature within the range of about 100° to about 300° C. and a pressure within the range of about 65 to about 225 atmospheres including between about 20 and 200 atmospheres partial pressure of hydrogen and wherein the catalytically active component of said hydrogenation catalyst is a mixture of metal oxides having the composition, calculated on an oxide-free basis, of 60 to 85 wt. percent of nickel, 14 to 35 wt. percent of copper and 1 to 5 wt. percent of chromium; X and Y are alkyl, said primary amino alkanol is an aminoethoxyalkanol and said alkylene oxide is ethylene oxide.

References Cited
UNITED STATES PATENTS 3,331,788   7/1967   Lorenson et al.

NICHOLAS S. RIZZO, *Primary Examiner.*